Sept. 5, 1939.  L. M. TOLMAN ET AL  2,171,612
APPARATUS FOR REMOVING FAT FROM ANIMAL CASINGS
Original Filed May 10, 1937   2 Sheets-Sheet 1
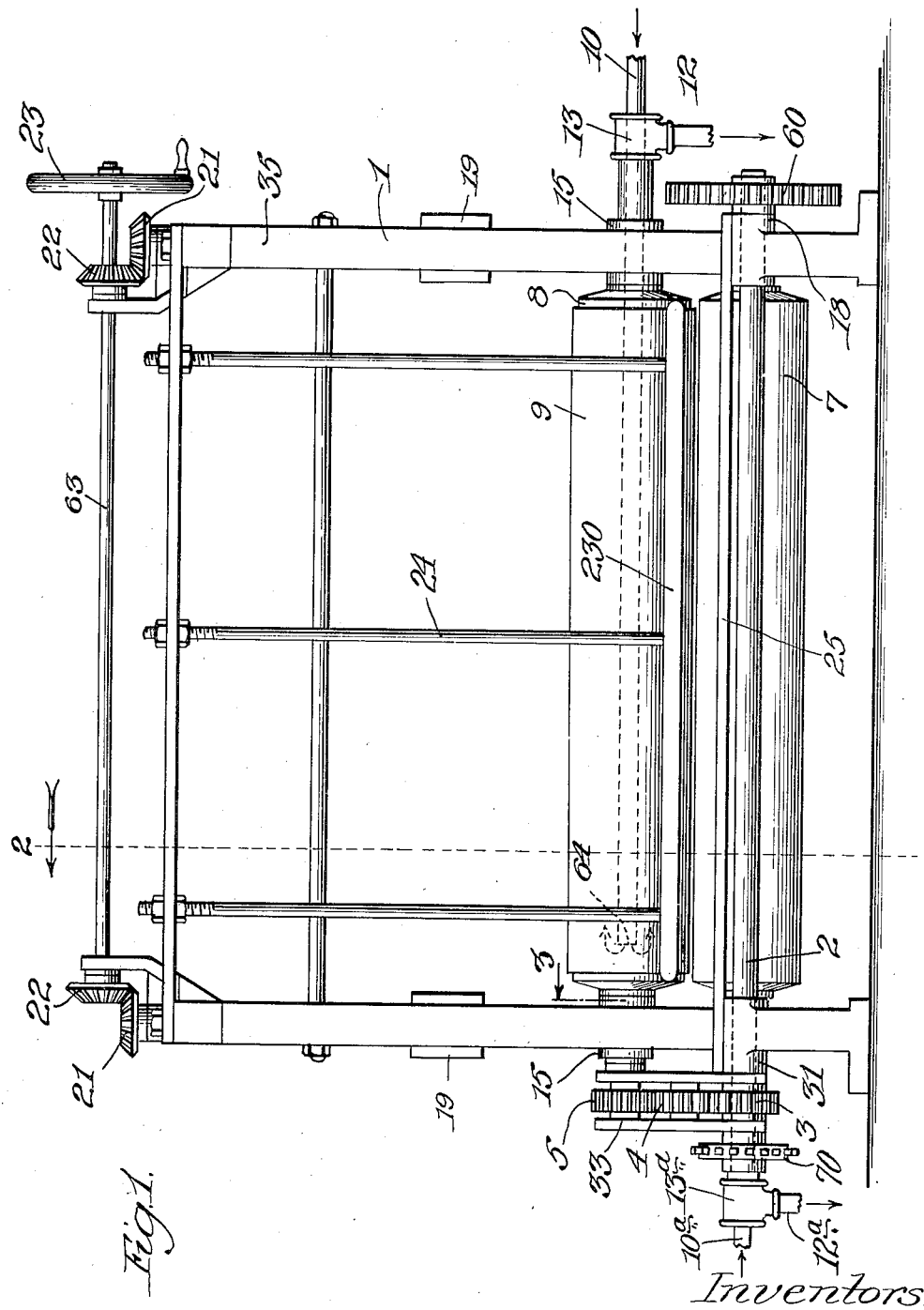
Inventors:
Lucius M. Tolman and
Lloyd E. Dimond,
By Critton, Wiles, Davies, Kirschk & Dawson
Attys.

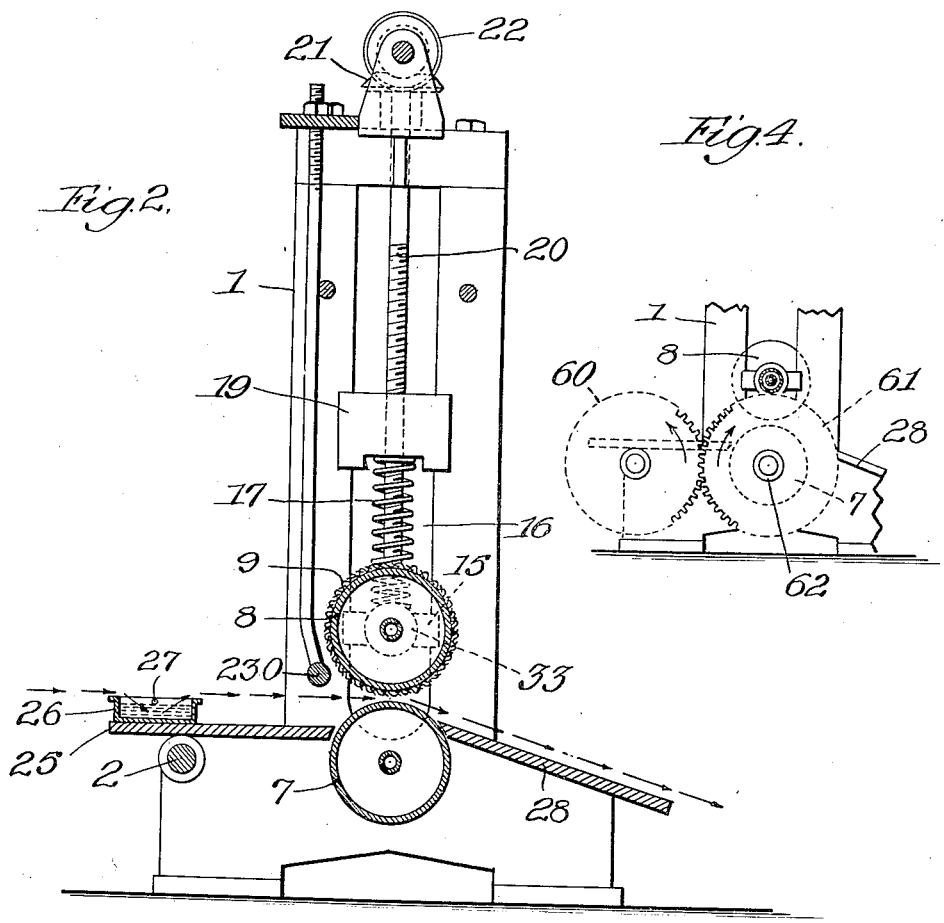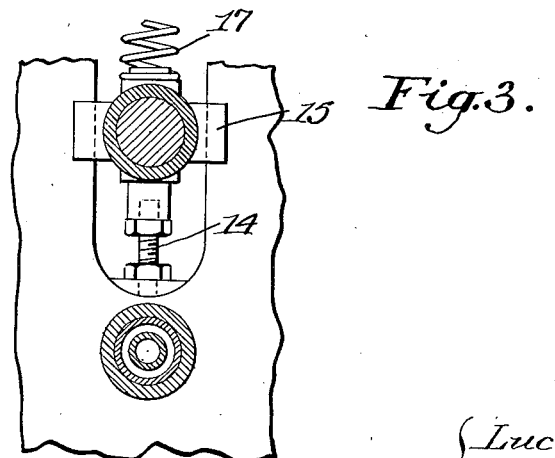

Patented Sept. 5, 1939

2,171,612

UNITED STATES PATENT OFFICE 2,171,612

APPARATUS FOR REMOVING FAT FROM ANIMAL CASINGS

Lucius M. Tolman and Lloyd E. Dimond, Chicago, Ill., assignors to Wilson & Co., a corporation of Delaware Original application May 10, 1937, Serial No. 141,879. Divided and this application August 15, 1938, Serial No. 225,020

4 Claims. (Cl. 17—43)

This invention relates to an apparatus for removing fat from animal casings.

Up to the present time animal casings prepared from intestines and the like have been treated for the removal of fat clinging to the surface thereof by shearing, cutting or scraping. This work has required a considerable amount of time and labor, and likewise it is impossible to remove all of the fat and attempts to remove even a considerable portion thereof are likely to cause considerable damage to the casings by scores, cracks, or other mutilations. This is true even of hand operations, which are even more expensive than the mechanical methods heretofore employed.

By means of the present invention fat is removed from the casings to a degree not heretofore practicable and at much lower cost.

The invention is illustrated in the drawings, in which—

Fig. 1 is a front elevation of the casing defatting machine; Fig. 2 is a sectional side elevation of the machine taken along the line 2 of Fig. 1; Fig. 3 is a vertical section taken along the line 3 of Fig. 1; and Fig. 4 is a fragmentary end view.

The apparatus comprises a bolted cast-iron frame 1 supporting bearings 18 and 31, adjusting screws 14 and movable bearings 15 for the shaft 33. A cylindrical metal roll 7 is journaled in bearings not shown and is propelled by the drive shaft 2 which is mounted in the base of the frame 1. The drive shaft is propelled by the sprocket 70 (Fig. 1, between gear 3 and stuffing box 13a) which is driven in any suitable manner. Gear 60 meshes with gear 61 on shaft 62 of the roll 7 and drives that roll.

The metal roll 8 is mounted in the frame above roll 7 and is covered by a suitable cloth 9. The cloth cover 9 aids in feeding the casings between the rolls and providing uniformity of movement. A preferred cloth for this purpose is a flannel such as canton flannel, in which the fuzzy side of the weave is outward. This roll is driven from shaft 2 by the gears 3, 4 and 5, 3 being mounted on shaft 2, 4 being an idler gear separating gears 3 and 5, and 5 being mounted on the shaft 33 carrying the roll 8. The roller shaft 33 is mounted in traveling bearings 15 above referred to, which are free to move up and down in the slots 16 of the frame. Springs 17 adjustably mounted as shown in Fig. 3 limit the movement of these bearings. Adjustment may be secured by the adjusting screws 14 which limit the downward movement of the bearing. The springs are constrained at their upper ends by the holders 19 which are threaded about the threaded bolts 20 vertically secured in the frame. The wheel 23 drives gears 22 which mesh with gears 21 mounted on the upper end of the bolts 20 and may be used to adjust the height of the spring holders 19, thereby increasing or diminishing the compressive force of the springs.

Both rolls 7 and 8 are hollow and are heated preferably by hot water, for example by the pipes 10 and 10a mounted inside the shafts upon which the rolls are mounted. Water passes inwardly through the pipes and out the ends 64 of the pipes and into the inside of the rolls and is withdrawn around the pipe and out at 12 and 12a after passing through the stuffing boxes 13 and 13a. (The inner end of pipe 10a is not shown in the drawings but the pipe is internally arranged like pipe 64.)

A safety guard rod 230, mounted upon elongated bolts 24 which are secured to the frame member 35, is provided.

At the incoming side of the device a shallow pan of water 26 is supported on the platform 25 in order to wet the casings slightly before passing them through the rolls. A guide rod 27 is provided at the surface of the water to force the casings beneath it.

A scraper 28 is provided at the exit side of the rolls to scrape the casings from the lower roll. With proper covering for the upper roll no scraper is required on it. The scraper is preferably made of a thermoplastic material like "Bakelite".

In operating the process the casings are dried in any convenient manner with the fat side exposed, to a moisture content preferably below 40%. Preferably the casings are split and doubled so that the material passing through the rolls consists of a pair of flat strips having the fatty side of each exposed, and the originally inner sides of each strip being together and unexposed. In drying the casings they are first cut to the desired length, placed around a mandrel and subjected to a drying atmosphere. A preferred moisture content is about 15% for the purpose of this invention.

The dried casings are then passed through the pan of water 26, the time of treatment being so short that no substantial amount of water is soaked into the casing but the surface thereof is moistened. This wetting step is not essential in the process, but has been found to eliminate or substantially decrease a tendency of some casings to leave a greasy-feeling surface.

The rolls are heated to a temperature preferably between 140° F. and 160° F. and the casings are passed through the heated rolls at a fairly slow rate of speed.

The rolls are preferably separated from each other by a distance of .005" to .050". The spring pressure is so adjusted on the rolls that they will separate further before tearing a casing.

The temperature and pressure of the rolls are so adjusted as to wring the fat from the surface. It is therefore important that the heat, amount of moisture present, speed of the rolls and the pressure be correlated so that the casing remains relatively hard while the fat is softened.

The casing emerging from the rolls is entirely or almost entirely fat free. The water present apparently keeps the fat from wetting the surface of the casing.

This application is a divisional application of our co-pending application, Serial No. 141,879, filed May 10, 1937.

The foregoing detailed description has been given for clearness of understanding only, and no unnecessary limitations should be understood therefrom, but the appended claims should be construed as broadly as permissible in view of the prior art.

We claim:

1. Apparatus for de-fatting animal casings, comprising a pair of normally separated oppositely rotatable rolls, one of said rolls being movably held in spaced relation by yielding means, means for internally heating said rolls, a fabric cover on one of said rolls, and means for driving both of the rolls.

2. Apparatus for de-fatting animal casings, comprising a pair of closely associated but normally slightly separated rolls, one of said rolls having a metal surface and the other of said rolls having a fabric surface, means for passing a heated fluid interiorly through each of said rolls, and means for holding the rolls yieldingly in their associated position.

3. Apparatus for de-fatting casings, comprising a frame, a pair of longitudinal rolls rotatably mounted in said frame, means for introducing and removing fluid through the axis of rotation of each of said rolls, adjustable means for yieldingly holding one of said rolls in close proximity to the other, and means for oppositely rotating said rolls.

4. Apparatus for de-fatting animal casings, comprising a pair of oppositely rotatable rolls, one of said rolls being movably held in spaced relationship to the other by yielding means, means for heating said rolls, one of said rolls having a metal surface and the other roll having a canton flannel surface, and means for driving both of the rolls.

LUCIUS M. TOLMAN.
LLOYD E. DIMOND.